Dec. 27, 1932. W. H. STANLEY 1,892,639
ANIMAL RINGER
Filed July 23, 1930 2 Sheets-Sheet 1
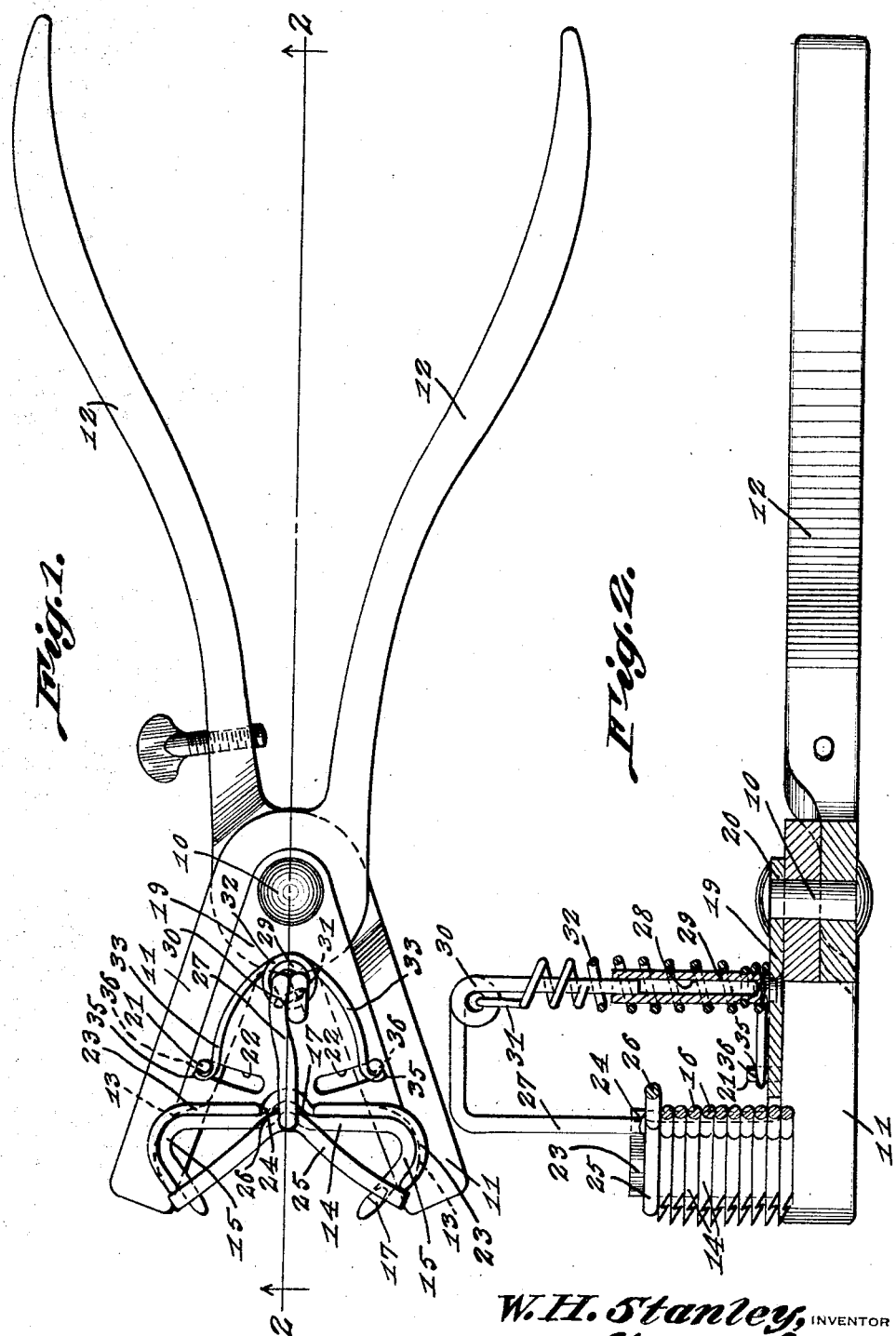
W. H. Stanley, INVENTOR
BY Victor J. Evans
ATTORNEY Dec. 27, 1932.  W. H. STANLEY  1,892,639
ANIMAL RINGER
Filed July 23, 1930  2 Sheets-Sheet 2
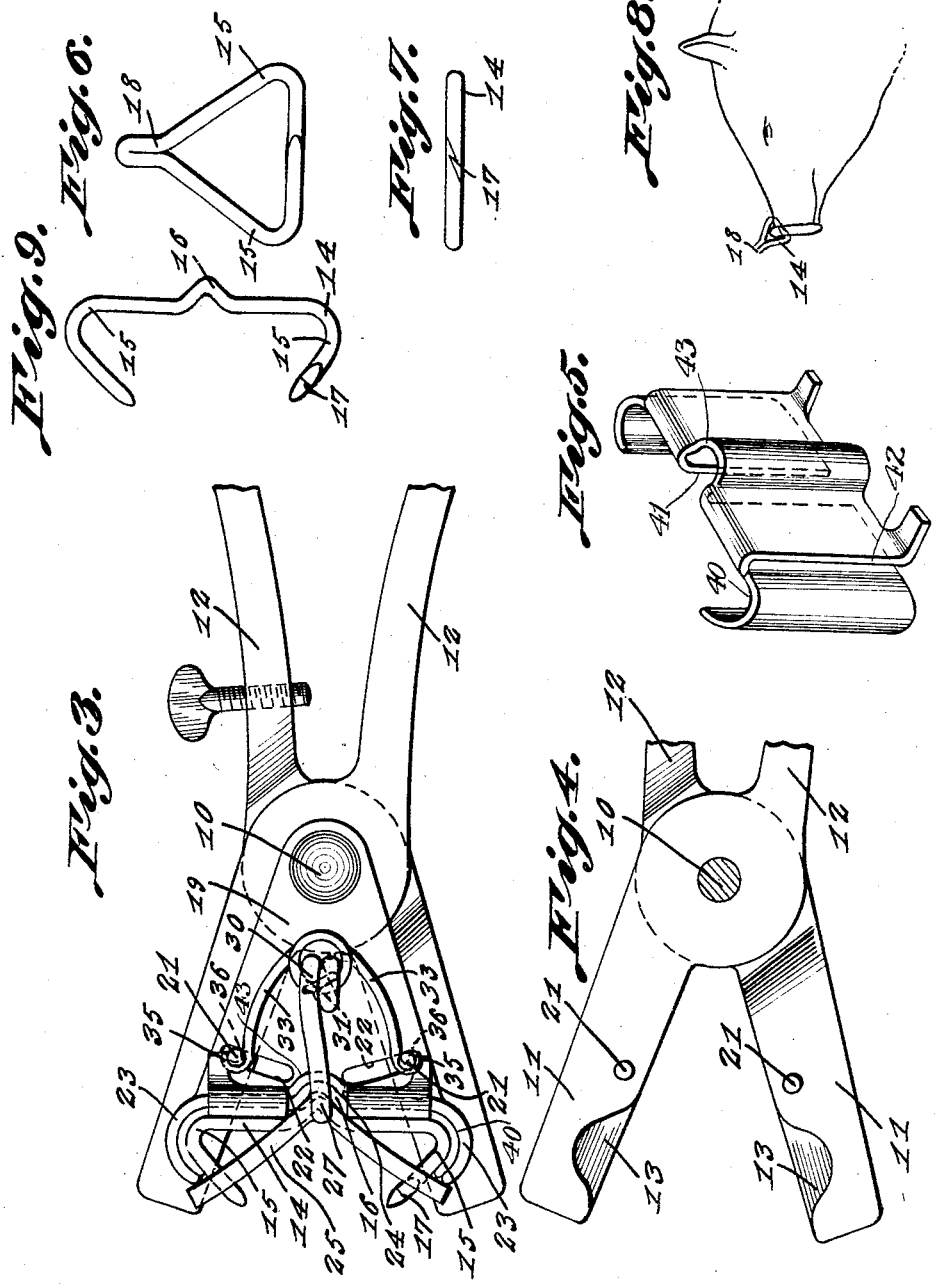
W. H. Stanley, INVENTOR
BY Victor J. Evans
ATTORNEY Patented Dec. 27, 1932

1,892,639

UNITED STATES PATENT OFFICE

WILLIAM H. STANLEY, OF CHARLES CITY, IOWA

ANIMAL RINGER

Application filed July 23, 1930. Serial No. 470,099.

This invention relates to tools for securing rings in the snouts of hogs and other animals, and has for an object the provision of a tool by means of which a ring may be held and secured through the animal's snout.

Another object of the invention is the provision of a tool which will hold a number of rings and feed them into position for insertion in the snout, the construction automatically placing a ring in position for use as soon as the preceding ring has been used.

Another object of the invention is the provision of a novel form of ring which is especially adapted for use in the tool set forth, means being included in the ring which will positively prevent rooting, and for preventing the animal from losing the ring.

With the above and other objects in view, the invention further includes the following novel features and details of construction, to be hereinafter more fully described, illustrated in the accompanying drawings and pointed out in the appended claims.

In the drawings:—
Figure 1 is an elevation of a tool constructed in accordance with the invention.

Figure 2 is a section on the line 2—2 of Figure 1.

Figure 3 is a fragmentary elevation showing one end of the tool with the magazine arranged for smaller rings.

Figure 4 is a view with the magazine removed and the pivot bolt shown in section.

Figure 5 is a detail perspective view of the magazine reducer.

Figure 6 is a plan view of one of the animal rings in closed position.

Figure 7 is an edge view of the same.

Figure 8 illustrates the ring in use.
Figure 9 is a plan view of the ring in open position.

Referring to the drawings in detail wherein like characters of reference denote corresponding parts, the invention as shown comprises a pair of pivotally connected members, the pivot pin of which is indicated at 10. These members comprise jaws 11 and handles 12, while the opposed faces of the jaws are provided with seats 13 for the reception of rings 14.

These rings are shaped as shown in Figure 9 of the drawings and are preferably formed of bendable wire. They comprise a pair of substantially V-shaped members 15 which are connected by a V-shaped offset portion 16. The outer ends of the member 15 are beleved as shown and are provided with undercut shoulders 17, so that when these ends are brought together they will interlock as shown in Figure 7 of the drawings and prevent accidental opening of the ring.

The ring is designed to be pressed through the snout of the animal as shown in Figure 8 with the ends of the ring interlocked and when so arranged the ring will be triangular shaped as shown in Figure 6, while the offset portion 16 will provide an extension 18 at one corner of the ring. This extension will serve to force the ring against the animal's snout when the animal is attempting to root, so that rooting will be positively prevented.

The rings are normally open as shown in Figure 9 of the drawings and in this position they are inserted in a magazine which is attached to the tool. This magazine comprises a plate 19 having an opening 20 for the passage of the pivot pin 10, so that this pin in addition to connecting the members of the tool, also serves as a means of attaching the magazine to the tool. In addition, the jaws 11 of the tool have studs 21 extending therefrom, and these studs pass through arcuate slots 22 so as to limit outward movement of the jaws. Extending at right angles from the plate 19 is a ring holder 23. This holder is shaped to slidingly receive the rings 14 when the latter are in open position, the shape of the holder being such as to conform to the shape of the V-shaped members 15. A slot 24 is provided in the holder for the passage of the offset portions 16 of the rings. The slots 22 are so arranged that the jaws 11 will open just sufficient to permit the rings to be moved from the holder into the seats 13.

The rings are stacked within the holder as shown in Figure 2 of the drawings and are engaged by a substantially V-shaped follower 25 which is provided with an extension 26 which projects through the slot 24. Secured to this follower is one end of a substantially U-shaped carrier 27 whose other end is slidable within the bore 28 of a hollow stud 29 which is carried by and extends from the plate 19. A loop or eye 30 is provided in the carrier 27 and has secured thereto one end 31 of a spring 32. The opposite end of this spring is attached to the plate 19 so that the carrier will be drawn inward under the tension of the spring to feed the rings 14 toward the jaws. The carrier is so proportioned that when the last ring has been fed into the seats 13, the loop or eye 30 will engage the outer end of the stud 29 and prevent the follower 25 from entering these seats.

A spring 33 serves to yieldingly hold the jaws in open position. This spring is provided with an eye or loop 34 intermediate its ends, and the outer ends of this spring are provided with hook-shaped extremities 35 which are disposed within notches 36 provided in the studs 21. Thus, the ends of the spring 33 are held in proper engagement with the studs and act to yieldingly hold the jaws against inward movement.

The rings 14 may be singly inserted in the magazine, or they may be arranged in clips and held together in such manner that pressure upon the ring while the latter is being closed will disconnect this ring from the remaining rings of the clip.

The outer ends of the jaws 11 are so constructed as to prevent lateral or pivotal movement of the lowermost ring within the magazine when the jaws are moved inward. This pivotal movement is also resisted by the extended portion 26 of the follower 25. The magazine reducer as shown applied in Figure 3 and detached in Figure 5 consists of a plate 40 which fits within the ring holder 23 and which is provided with a slot 41 that registers with the slot 24. The slot 40 is provided with a fold wall 42, which fits against the outer side of the holder 23 and which in turn is provided with a groove 43 which bridges the registering slots and which may receive the offset portions 16 of the rings. The invention is susceptible of various changes in its form, proportions and minor details of construction and the right is herein reserved to make such changes as properly fall within the scope of the appended claim.

Having described the invention what is claimed is:—

A nose ring applying tool comprising a pair of jaws connected together by a pivot pin, a plate pivoted upon said pin and extending along both jaws, said jaws having seats at their inner sides adapted to receive a ring, said plate having a ring holder adapted to retain a stack of rings, said ring holder having a slot disposed upon the plane of the median longitudinal dimension of the plate and at a right angle thereto, means for limiting the relative swinging movement of the jaws and plate, a follower having an extension slidable in the slot of the ring holder, and means for supporting the follower upon the plate at a point between the pivot pin and the ring holder and upon the median longitudinal dimension of the plate.

In testimony whereof I affix my signature.

WILLIAM H. STANLEY.